United States Patent

Sterly

[15] 3,659,858

[45] May 2, 1972

[54] AUTOMATIC TERMINATION OF OPERATION OF A CASSETTE CHANGER

[72] Inventor: Glenn E. Sterly, Carol Stream, Ill.

[73] Assignee: Ampex Corporation, Redwood City, Calif.

[22] Filed: Nov. 10, 1969

[21] Appl. No.: 875,046

[52] U.S. Cl. ....................274/4 F
[51] Int. Cl. ....................G11b 23/12
[58] Field of Search ....................274/4 F; 353/15, 116, 117; 352/8, 123; 179/100.2 Z; 242/197–200

[56] References Cited

UNITED STATES PATENTS

| | | | |
|---|---|---|---|
| 3,453,397 | 7/1969 | Miller | 264/4 F |
| 3,317,212 | 5/1967 | Tatter | 274/4 F |
| 3,359,665 | 12/1967 | Gerry | 274/4 F |
| 3,512,785 | 5/1970 | Ban | 274/4 F |

FOREIGN PATENTS OR APPLICATIONS

| | | | |
|---|---|---|---|
| 1,578,053 | 7/1969 | France | 274/4 F |

*Primary Examiner*—William D. Martin, Jr.
*Assistant Examiner*—Dennis A. Dearing
*Attorney*—Luedeka, Fitch, Even & Tabin and Robert G. Clay

[57] ABSTRACT

After the playing of a cassette stored in the last one of a series of storage compartments of a cassette changer apparatus, the operation thereof is automatically terminated and operated manual controls or selectors are returned from on positions to off positions. The preferred selectors are push buttons which remain depressed in an on position until the playback or recording of the last cassette is terminated so that during the playing of the last cassette the actual mode of operation of the cassette recorder is correctly indicated to the user.

7 Claims, 6 Drawing Figures

INVENTOR
Glenn E. Sterly

Anderson, Luedeka, Fitch, Even & Tabin ATTYS.

Patented May 2, 1972 3,659,858

3 Sheets-Sheet 2

INVENTOR
Glenn E. Sterly

Anderson, Luedeka, Fitch, Even, & Tabin ATTYS.

INVENTOR
Glenn E. Sterly

Anderson, Luedeka, Fitch, Even & Tabin ATTYS.

AUTOMATIC TERMINATION OF OPERATION OF A CASSETTE CHANGER

This invention relates generally to a tape cassette changer apparatus for automatically transferring a series of cassettes stored in compartments of a magazine to an operative playing position for playback from or recording onto a tape within each cassette and, more particularly, to a mechanism for automatically terminating operation of the cassette changer after having played through to the end of a series of cassettes stored in the magazine.

It if particularly advantageous that the cassette changer be capable of automatically shutting off after the playing of the cassettes so that the operation of the cassette changer need not be monitored by the operator. Thus, in a known cassette changer, there has been provided a facility for shutting off the cassette changer, but this facility returned push button controls or selectors to "off" positions at the commencement of the play of the last cassette. Thus, the push buttons were in positions indicating that the cassette changer was no longer in a playback or recording mode of operation when, in fact, the cassette changer was still playing back from or recording onto the tape in the last cassette. Such premature return of the push buttons will interfere with other subsidiary modes of operation such as, for example, a fast tape winding or momentarily pause while the last cassette is in the changer. Moreover, when a machine is in operation, it is preferred that the selectors at all times be truely representative of the mode in which the cassette changer is operating so as to prevent any misadvertent operation thereof, particularly by unskilled users.

Accordingly, an object of the invention is to return selectors to an "off" position and automatically shut off a cassette changer when the last cassette is returned to its storage compartment.

Other objects and advantages of the invention will become apparent from a detailed description taken in connection with the accompanying drawings in which.

Figures 3, 4:
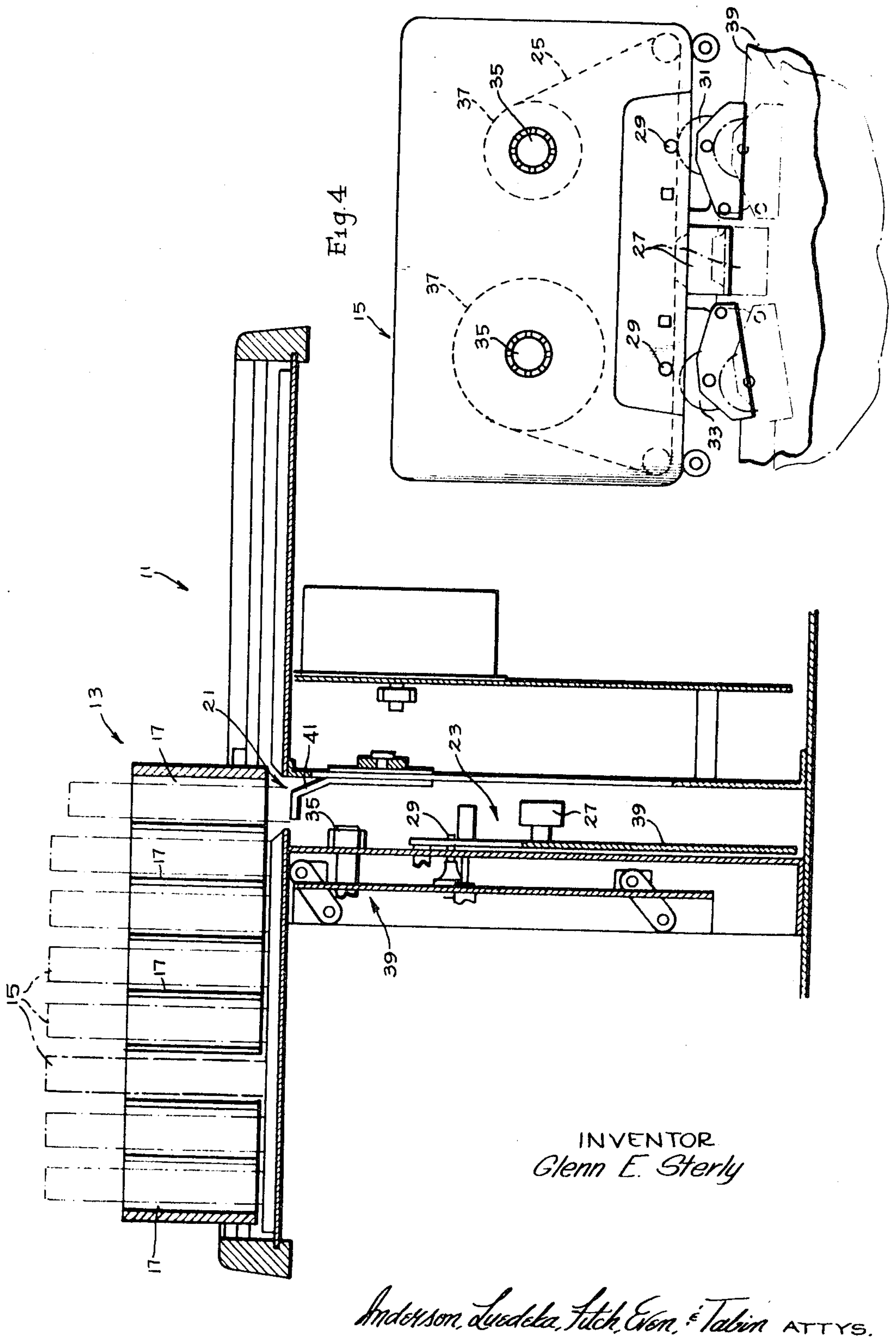
FIG. 3 is a partial, sectional view showing the cassette storing magazine and a cyclically operable means for transferring cassettes to and from a station for playback or recording on a tape.
FIG. 4 is a diagrammatic view of a cassette and pause carrier having a sound transducer head and tape feed pinch rollers thereon.

As shown in the drawings for purposes of illustration, the invention is embodied in a cassette changer 11 having a shiftable magazine 13 in which are stored a series of cassettes 15 in magazine compartments 17 each of which is adapted to be aligned with a transfer slot 21, as best seen in FIG. 3, for transfer by cyclically operable mechanism 23 to an operative playing station at which a tape 25 is driven past a sound transducer head 27 (FIG. 4). The tape is driven by a tape feed means including a pair of tape drive capstans 29 which are projected into the tape cassette behind the tape and cooperate an associated forward drive pinch roller 31 or a reverse drive pinch roller 33 to drive the tape past the transducer head while spindles 35 are inserted into tape reels 37 in the cassette 15. The spindles 35 and capstans 29 are carried on a shiftable chassis 39 to penetrate into the cassette as the latter is lowered by the shiftable chassis. When one or both sides of the tape have been played, the movable chassis is automatically moved upward and an elevator 41 is operated to lift the cassette to return the same through the transfer slot to its compartment within the magazine. After return of the cassette, the magazine is automatically stepped forward by means of a pawl mechanism 43 which functions to turn a shaft 45 on which is a drive gear 47 (FIG. 6) meshed with a rack 49 fixed to a longitudinally extending side of the magazine.

Figure 1:
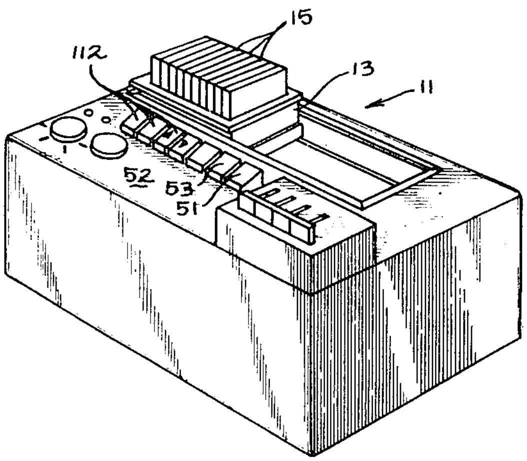
FIG. 1 is a perspective view of a cassette changer apparatus embodying the invention.

To commence operating the cassette changer, an on/off selector 51 (FIG. 1) on an upper panel 52 of the cassette changer is operated to complete an electrical circuit to the source of electrical power and then a playback or recording play/record selector 53 is operated to cause the operation of the motor drives (not shown) for the cyclically operable mechanisms which transfer the cassettes to and from the magazine and cause the pawl mechanism 43 to step the magazine forwardly to transfer the cassettes until the last cassette compartment is positioned over the transfer slot.

In accordance with the present invention, the on/off and play/record selectors are retained in their operated condition while the cassette from the last magazine compartment is playing or recording and while the last cassette is returning to the last magazine compartment. This shut-off mechanism is conditioned by movement of the magazine to position the last compartment at the transfer station and then after the return of the cassette to its magazine chamber, the conditioned shut-off mechanism operates a selector release member which releases the on/off and play/record selectors to return to their "off" positions whereby the cyclically operable means and the connection to electrical power are shut off. By retaining the play/record selector in the operated condition during the playback or recording of the final cassette, the cassette changer reflects the true operational mode of the cassette changer to the operator. Also, as the appropriate selectors are in their on position, the operator may institute other functions of the cassette changer such as, for example, a fast wind of tape, a repeat playback or recording, a pause or other functions as is disclosed in copending application, Ser. No. 875,045, entitled "Cassette Lowering and Release Mechanism," filed of even date.

Figure 2:
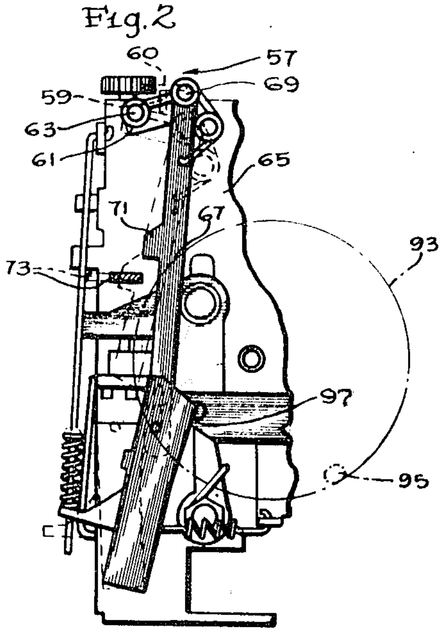
FIG. 2 is a diagrammatic view of means for automatically shutting off the cassette changer of FIG. 1.

Referring now to the drawings and, more particularly, to FIG. 2, the shut-off mechanism is conditioned by means of a depending cam 57 fixed to the underside of the tray-like magazine 13. As best seen in FIG. 2, the depending cam is in the form of a vertically disposed pin 59 fixed to one end of a leaf spring 60 fastened to the underside of the magazine. The cam pin is carried by the magazine when shifting its last compartment to the transfer station 21 to a position to strike the upper side of a pivotally mounted conditioning lever 61 which is journaled on a post 63 fixed to a stationary vertical side wall 65 of the cassette changer. As the cam pin strikes the upper side of the conditioning lever, the latter pivots downwardly in a clockwise direction as viewed in FIG. 2 about its pivot post and swings downwardly a conditioning link or driver 67 which is pivotally connected thereto by a pivot pin 69.

Figure 5:
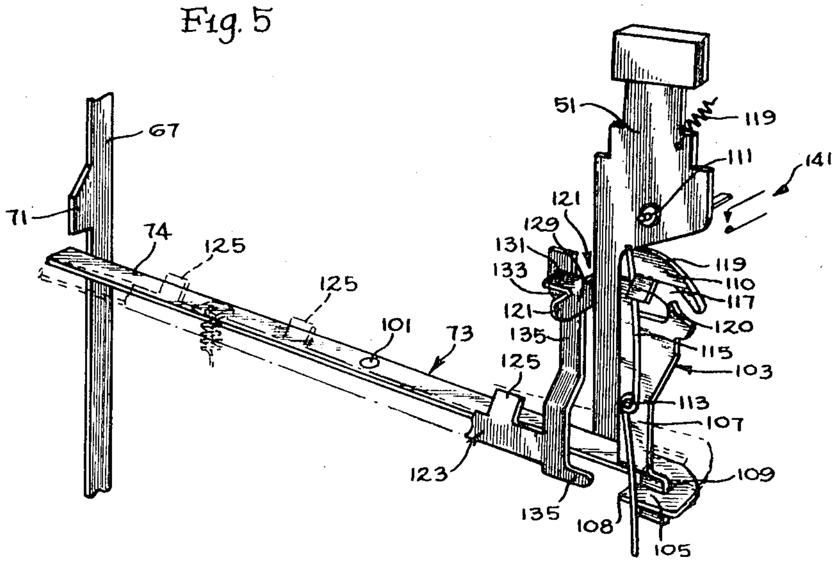
FIG. 5 is a diagrammatic, perspective view of a release lever for operating latch pawls to release depressed push button.

Formed generally centrally of the elongated conditioning driver 67 is a laterally extending drive lug 71 which is normally disposed in a plane above the adjacent end of an automatic shut-off lever 73 for non-engaging travel above the shut-off lever until the driver 67 is shifted downwardly by the cam pin 95. More specifically, when the conditioning lever 61 is pivoted downwardly by the cam pin, the driver lug 71 on the driver 67 is lowered into a horizontal plane for subsequently engaging and pivoting an end 74 of the shut-off lever, as shown in FIGS. 2 and 5.

Figure 6:
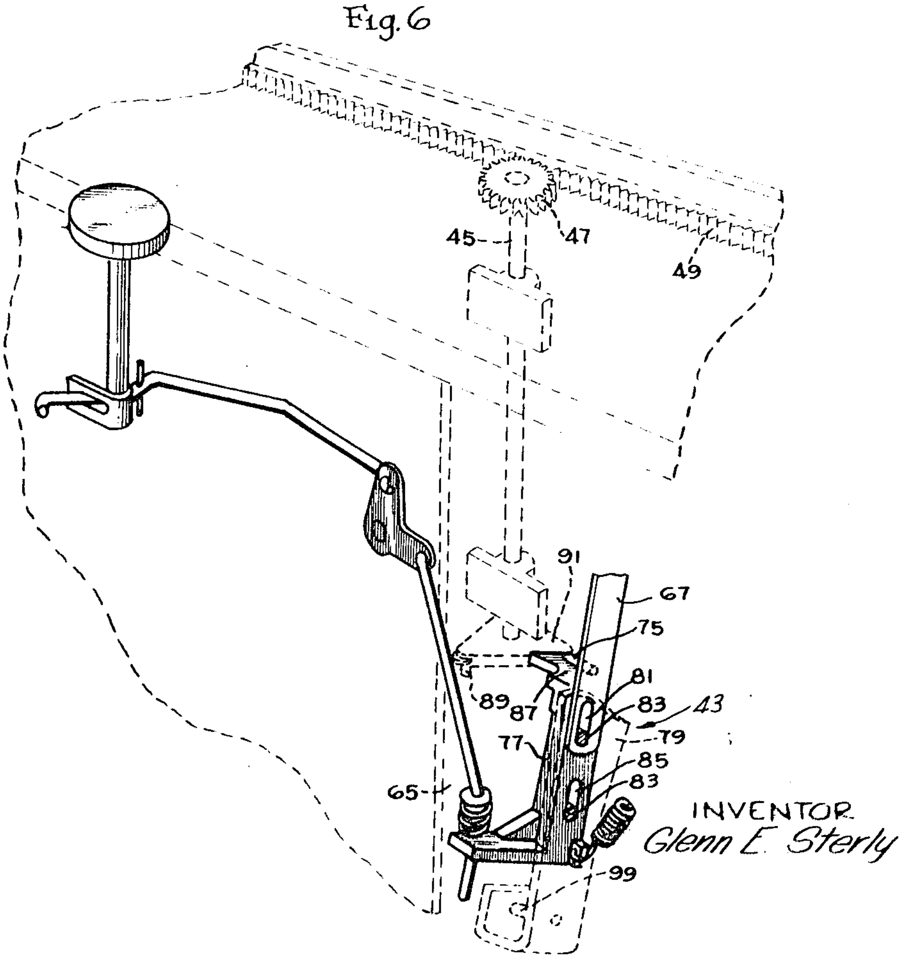
FIG. 6 is an enlarged diagrammatic view of a magazine stepping pawl and the pawl carrier therefor.

The conditioned driver 67 is driven laterally to operate the shut-off lever 73 to a position, shown in phantom lines in FIG. 2, by the pawl mechanism 43 which normally functions to step the magazine 13 forwardly to position the next magazine compartment at the transfer station 21. The pawl mechanism, however, is disabled at this time by a pin 75 carried on the driver 67 moving into engagement with the top of a feed pawl 77 and forcing the feed pawl down to an inoperative position. As best seen in FIG. 6, the lower end of the driver 67 is disposed intermediate the feed pawl 77 and carrier 79 for the pawl and the lower end of the driver has an elongated slot 81 which receives an upper one of a pair of laterally extending pins 83 fixed to the pawl carrier and projecting laterally into vertically elongated slots 85 in the pawl 77. The elongated slots 85 permit the pawl 77 to be driven down by the pin 75 on the driver 67 to a position in which a laterally extending pawl tooth 87 on the pawl is a plane beneath nibs 89 on a triangular-shaped member 91 which turns the shaft 45 when the pawl tooth is a plane to engage and turn the triangular member through a 120° turn.

The pawl mechanism 43 is driven by a gear 93, as best seen in FIG. 2, which carries a pin 95 affixed to a vertical face of the gear 93 about a circular path to abut an inclined cam surface 97 on the pawl carrier during the last 45° of a turning cycle for the gear 93. The driving pin 95 pivots the pawl carrier counterclockwise as viewed in FIGS. 2 and 6 about a pivot stud 99 fixed at one end to the stationary wall 65 thereby swinging the pawl 77 counterclockwise beneath a nib 89 on the triangular-shaped member 91. The pawl carrier acts through pin 83 which is in the slot 81 of the driver 67, to swing the lower end of the driver 67 counterclockwise with the result that the driving lug 71 on the driver 67 abuts and swings the end 74 of the shut-off lever 73 about vertically disposed, pivotal mounting post 101 (FIG. 5) in a direction to release a latch pawl 103 holding the play/record push button selector 31 in a depressed actuated position. More specifically, the automatic shut-off lever 73 is formed with a hook 105 receiving a depending foot 107 on the latch pawl 103 to pivot the same. In this instance, the hook 105 moves in a horizontal plane which is substantially normal to the plane of the latch pawl 103 and the hook partakes of a substantial movement to bring a distal end 108 of the hook 105 against the foot of the latch pawl and thereby pivot an upper head 110 of the latch pawl outwardly whereby a locking pin 111 on the push button selector 51 is free to rise from the latch pawl head 110. As more fully explained in the aforesaid copending application, a slight depression and then release of the selector 51 also acts to shift the latch pawl and release the push button selector. An opening 111 in the hook 105 accommodates this amount of movement which is quite small in comparison to the movement of the hook by the automatic shut-off lever 73. Thus, the automatic shut-off lever is always in position for operation, but yet does not interfere with normal operation and release of the latch pawl 103 by a slight depression of the push button.

Several of the remaining push button selectors 112 are latched by a latch pawl similar to the illustrated latch pawl 103 and are pivotally mounted adjacent to their respective selectors on horizontally disposed pivot pins similar to the pivot pin 113 on which is mounted a return spring 115 for the latch pawl. Thus, a description of the on/off push button selector 51 and its latch pawl 103 will provide an understanding of the other push button selectors and their respective latch pawls. The upper head 110 of the latch pawl 103 is formed with a hook-shaped opening or mouth 117 and with a top curved surface 119 to be engaged during a downward movement by the pin 111. Downward movement of the pin 111 cams the latch pawl 103 counterclockwise as viewed in FIG. 5 until the pin 111 is aligned to enter the opening 117 whereby the flexed upper end of the torsion spring 115 pivots the pawl clockwise to capture the push button pin 111 and hold the push button against the upward pull of a contractile return spring 119 fastened to one end of the push button selector 31 and to a stationary frame member. The pin 111 abuts a side of a downwardly and forwardly inclined tab 120 on the latch pawl to limit the clockwise turning thereof until the push button selector is depressed for release, at which time the pin 111 moves down from engagement with the inclined tab allowing the spring 115 to turn the latch pawl clockwise slightly to a position beneath the inclined tab whereupon the spring 119 lifts the selector with the pin 111 forcing the latch pawl outwardly.

For the purpose of resetting the other latched ones of the push buttons 112, which may have been operated at the time of automatic shut off, the on/off selector 51 is provided with a release cam 121 which cams a release lever 123 which has a plurality of upstanding lugs 125 for pivoting to engage and rock each of the latch pawls to a release position to assure that its push button selector 112 is released and returned by its return spring 119. In this instance, the release cam 121 includes an integral bent forward portion 129 from which extends a lateral tab 131 for engaging an inclined cam surface 133 on an upstanding finger 135 of the release lever 123. As the push button selector 51 rises, its lateral tab 131 abuts the inclined cam 133 and forces it rearwardly thereby pivoting the release lever 123 about a pivotal axis through a pair of pivot ears 135 thereon. As the release lever pivots rearwardly, the lugs 125 abut the feet of the associated latch pawls and pivot the lower ends thereof inwardly which result in the upper ends pivoting outwardly from the push button selectors. Thus, all of the push button selectors 112 are simultaneously released and reset. Reset of the on/off selector operates electrical contacts 141 to disconnect electrical power to the cassette changer which is thereby shut off.

For the purposes of facilitating a better understanding of the illustrated embodiment of the invention, a brief description of the operation of the automatic reset of push button selectors will be described. As the cassette changer shifts the last magazine compartment over the transfer slot 21, the cam 57 on the underside of the magazine abuts the upper surface of the conditioning lever 61 and pivots it down about pivot post 63 to force the driver 67 downwardly whereby a pin 75 on the driver forces the pawl 77 down to an inoperative position to prevent any further attempt to step the magazine forwardly.

The conditioning of the driver also lowers the driving lug 71 thereon to a position aligned with an end of the automatic shut-off lever 73.

After playback or recording operation, the cyclically operable mechanism including the elevator 41 returns the cassette to the last of the magazine compartments and, during the final portion of the returning of the cassette to the magazine, the pin 95 on the gear 93 engages the inclined cam surface 97 on the pawl carrier 79 and pivots it about its pivot stud 99 whereby the pin 83 on the pawl carrier acts on the lower end of the driver 67 to pivot it about its upper end and thereby swings the driving lug 71 to abut and then to pivot the shut-off lever 73 about its axis through a pivot pin 101. During swinging of the shut-off lever 73, its hook 105 pulls the lower end of the latch pawl 103 rearwardly while the upper head 110 of the latch pawl swings forwardly from the pin 111 on the selector so that the selector is free to be pulled upwardly by its return spring 119. As the on/off selector 51 is pulled upwardly to the off position, the actuator cam 121 thereon cams the inclined surface 133 rearwardly causing release lever 123 to pivot its release lugs 125 thereon rearwardly against each of the other selector latch pawls to swing the upper ends of the pawls forwardly from the respective selectors which are then free to be lifted by the return springs 119. As the on/off selector rises, it opens the electrical contacts 141 to disconnect power to the cassette changer.

From the foregoing, it will be seen that the cassette changer push button selectors remain in the play/record mode during a playback or recording of the cassette from the last compartment and that makes it more feasible to operate other selectors for fast wind, pause or other operations at this time. With the present invention, the push button selectors are reset and the cassette changer is shut off automatically by mechanisms which are simple in construction and inexpensive to manufacture and, hence, are commercially acceptable.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a cassette changer for cassettes having a pair of tape reels between which a tape is wound and unwound, a magazine having compartments for storing a series of cassettes and positioning each of said cassettes at a transfer station for movement to an operating station, cyclically operable means including a shiftable chassis for transferring a cassette from said transfer station to said operating station and for returning said cassette to said magazine, stepping means operable by said cyclically operable means for stepping said magazine to position another compartment at said transfer station, a first selector means shiftable from a first position at which said cyclically operable means is inactive to a second position at which said cyclically operable means is repetitively cycled to play consecutively the cassettes stored in said compartments until said magazine has stepped a last one of said compartments into transfer position, second selector means for instituting and controlling operational functions of said cassette changer for each of said cassettes including the cassette from the final compartment, conditioning means operable by said magazine upon positioning of said final magazine compartment at said transfer station into an operative position for disabling said stepping means from shifting said magazine after playing of said final cassette, and shut-off means operable by said conditioned means in said operative position and after playing of said last cassette to shift said first selector means to said first position to render said cyclically operable means inactive.

2. A cassette changer in accordance with claim 1 in which said first selector means includes a push button which is depressed from an upper first position to a lower second position and in which said shut-off means returns said push button to said upper first position.

3. A cassette changer in accordance with claim 2 in which a latch means latches said push button in said second position and in which said shut-off means includes a shut-off member for operating said latch means to release said push button for returning to said upper first position.

4. A cassette changer in accordance with claim 3 in which said shut-off member is a pivotally mounted lever and said latch means includes a latch pawl shifted by said lever to release said push button to return to said upper first position.

5. A cassette changer in accordance with claim 4 in which said conditioning means includes a conditionable driver and a cam carried by said magazine for camming said driver to an operative to an operative position with positioning of said magazine with said last one of said compartments at said transfer station, said driver being located at said operative position to be actuated by said stepping means to pivot said shut-off lever and thereby operate said latch pawl to release said push button.

6. A cassette changer in accordance with claim 5 in which a driving lug is formed on said driver for engagement with one end of said shut-off lever to pivot for engagement with one end of said shut-off lever to pivot the same and in which a hook is formed on the other end of said shut-off lever to operate said latch pawl to release said push button.

7. In a cassette charger for automatically playing each of a series of cassettes having a pair of tap reels between which a tape is wound and unwound, a magazine having compartments for storing the series of cassettes and for positioning each of said cassettes at a transfer station for movement to an operating station for recording or a playback operation, cyclically operable means including a shiftable chassis for transferring a cassette from said transfer station to said operating station and for returning said cassette to said magazine, stepping means operable by said cyclically operable means for stepping said magazine to position each of said compartments at said transfer station, an on/off selector means shiftable between on and off positions for causing said cassette changer in the on position to repetitively cycle the cassettes stored in said compartment, cam means associated with said cassette magazine, conditioning means comprising a driver operable by said cam means to a conditioned position with arrival of said final compartment at said transfer station, stepping means for stepping said magazine to positioning each of said compartments at said transfer station and including a stepping pawl movable by said driver to an inoperative position to prevent stepping of said magazine when said last compartment is at said transfer station, said stepping means actuating said conditioned driver after the playing of said last cassette, a shut-off lever operable by said driver when the latter is in said conditioned position and actuated by said stepping means, other selector means for controlling operations of said cassette changer during playback or recording of each cassette including said last one of said cassettes and until said on/off selector means is shifted to said off position, and means releasably holding said on/off selector means in said on position during the playback or recording operation for each cassette and operably by said shut-off lever to release said on/off selector means after playing or recording of said last cassette to automatically shut off said cassette changer.

* * * * *